United States Patent
Singla

(10) Patent No.: US 10,923,261 B2
(45) Date of Patent: Feb. 16, 2021

(54) MAGNETIC FASTENING ASSEMBLY

(71) Applicant: Microsoft Technology Licensing, LLC, Redmond, WA (US)

(72) Inventor: Aseem Singla, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 151 days.

(21) Appl. No.: 16/175,543

(22) Filed: Oct. 30, 2018

(65) Prior Publication Data
US 2020/0135372 A1    Apr. 30, 2020

(51) Int. Cl.
| | |
|---|---|
| *H01F 13/00* | (2006.01) |
| *H01F 7/02* | (2006.01) |
| *F16B 1/00* | (2006.01) |
| *H01F 41/02* | (2006.01) |

(52) U.S. Cl.
CPC ............... *H01F 7/02* (2013.01); *F16B 1/00* (2013.01); *H01F 41/0253* (2013.01); *F16B 2001/0035* (2013.01)

(58) Field of Classification Search
CPC ........ H01H 50/58; H01H 50/02; H01H 50/30; H01H 50/14; H01H 50/36
USPC ......................................................... 335/284
See application file for complete search history.

(56) References Cited

U.S. PATENT DOCUMENTS

| | | | | |
|---|---|---|---|---|
| 3,893,059 A | * | 7/1975 | Nowak | G01P 3/481 338/32 R |
| 4,003,336 A | * | 1/1977 | Koester | G11B 5/845 118/640 |
| 4,109,667 A | | 8/1978 | Quirk | |
| 4,881,054 A | * | 11/1989 | Polgar | H01H 51/2236 335/230 |
| 7,607,430 B2 | | 10/2009 | Davis | |
| 8,179,219 B2 | * | 5/2012 | Fullerton | G01D 18/00 335/284 |
| 8,228,151 B2 | * | 7/2012 | Schmidt | H02K 35/02 335/296 |

(Continued)

FOREIGN PATENT DOCUMENTS

| | | |
|---|---|---|
| CN | 107210112 A | 9/2017 |
| CN | 207353584 U | 5/2018 |

(Continued)

OTHER PUBLICATIONS

"International Search Report and Written Opinion Issued in PCT Application No. PCT/US2019/056414", dated Jan. 24, 2020, 13 Pages.

(Continued)

*Primary Examiner* — Shawki S Ismail
*Assistant Examiner* — Lisa N Homza
(74) *Attorney, Agent, or Firm* — Holzer Patel Drennan

(57) ABSTRACT

A fastening assembly is provided that includes a first permanent magnet having a first operating temperature and a second permanent magnet having a second operating temperature lower than the first operating temperature. The first permanent magnet is attachable to the second permanent magnet in a locked state at a first temperature lower than the second operating temperature. The first permanent magnet is releasable from the second permanent magnet in an unlocked state at a second temperature that is higher than the second operating temperature.

12 Claims, 5 Drawing Sheets

(56) References Cited

U.S. PATENT DOCUMENTS

| | | | | |
|---|---|---|---|---|
| 8,514,040 | B2* | 8/2013 | Gruner | H01H 51/2263 335/177 |
| 8,576,031 | B2* | 11/2013 | Lauder | G06F 1/1626 206/320 |
| 8,928,437 | B2* | 1/2015 | Lauder | G06F 1/1626 206/320 |
| 9,113,705 | B1 | 8/2015 | Jacob et al. | |
| 9,279,527 | B2 | 3/2016 | Davis | |
| 9,607,746 | B2* | 3/2017 | Buerssner | H01F 7/08 |
| 10,404,150 | B2* | 9/2019 | Swanson | H02K 35/06 |
| 2007/0133156 | A1* | 6/2007 | Ligtenberg | G06F 1/1679 361/679.27 |
| 2012/0068919 | A1* | 3/2012 | Lauder | G06F 1/1626 345/156 |
| 2013/0162668 | A1* | 6/2013 | Lauder | G06F 1/1626 345/619 |
| 2014/0043741 | A1* | 2/2014 | Smith | H05K 5/02 361/679.3 |
| 2014/0110045 | A1 | 4/2014 | Leggett | |
| 2016/0032954 | A1 | 2/2016 | Porter | |
| 2017/0351347 | A1 | 12/2017 | Yamada | |

FOREIGN PATENT DOCUMENTS

| | | |
|---|---|---|
| EP | 2943084 A1 | 11/2015 |
| JP | 5842838 B2 | 1/2016 |
| WO | 2015183798 A1 | 12/2015 |

OTHER PUBLICATIONS

"Magnets with an OFF Switch", https://web.archive.org/web/20150509014121/https:/www.kjmagnetics.com/blog.asp?p=magswitch, May 9, 2015, 9 Pages.

"Using Magnets Instead of Fasteners or Welding as a Means of Joining Parts", https://www.duramag.com/techtalk/magnetic-assemblies/using-magnets-instead-of-fasteners-or-welding-as-a-means-of-joining-parts/, Jan. 28, 2016, 9 Pages.

\* cited by examiner

MAGNETIC FASTENING ASSEMBLY

BACKGROUND

The present disclosure relates generally to fasteners and fastening devices/assemblies.

Generally, a fastening mechanism such as a screw or snap feature may be used to attach two components of a device. However, the clean aesthetic requirements of a finished product in certain applications may make the use of unsightly screws and other snap features undesirable. Such aesthetic requirements may exist, for example, for display monitors and/or mobile devices with displays. Current solutions in such devices include, for instance, using adhesive to bond the display to a housing or chassis in a mobile phone or a laptop computer.

More specifically, in some applications, Pressure Sensitive Adhesive (PSA) may be used to address such clean aesthetic requirements. PSA can achieve a clean and high-strength fastening mechanism. However, the ease of removal of a component that is attached by PSA is inversely proportional to the strength of the attachment, while using a higher strength PSA makes the removal process much more difficult in cases where there is a need for subsequent removal of a PSA-attached component.

Accordingly, more practical fasteners and fastening mechanisms are needed.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a fastening assembly includes a first permanent magnet having a first operating temperature and a second permanent magnet having a second operating temperature lower than the first operating temperature. The first permanent magnet is attachable to the second permanent magnet in a locked state at a first temperature lower than the second operating temperature. The first permanent magnet is releasable from the second permanent magnet in an unlocked state at a second temperature that is higher than the second operating temperature.

In a further aspect, a method is provided for using a fastening assembly including a first permanent magnet and a second permanent magnet. The method may include attaching a first surface of the first permanent magnet to a first component of a device, where the first permanent magnet has a first operating temperature. The method may further include attaching a second surface of the second permanent magnet to a second component of the device, where the second permanent magnet has a second operating temperature lower than the first operating temperature. The method may further include attaching the first component of the device to the second component of the device by aligning a third surface of the first permanent magnet opposite the first surface with a fourth surface of the second permanent magnet opposite the second surface so as to lock the first permanent magnet with the second permanent magnet at a first temperature lower than the second operating temperature.

In another aspect, a fastening assembly kit includes a first permanent magnet having a first operating temperature and a second permanent magnet having a second operating temperature lower than the first operating temperature. The first permanent magnet is attachable to the second permanent magnet in a locked state at a first temperature lower than the second operating temperature. The first permanent magnet is releasable from the second permanent magnet in an unlocked state at a second temperature that is higher than the second operating temperature.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide a magnetic fastening assembly including two permanent magnets with different operating temperatures such that the fastening assembly can be locked/fastened at temperatures below the operating temperatures of both permanent magnets and can be unlocked/released at temperatures larger than at least one of the two operating temperatures of the two permanent magnets. The present aspects take advantage of the permanent degradation of the magnetic strength of permanent magnets over certain temperature thresholds to provide a temporary fastening mechanism that can be unlocked/released by applying heat to a permanent magnet. Thus, the magnetic fastening assembly may provide a practical and efficient mechanism for reliably connecting components in devices while at the same time enabling simple disassembly and rework.

Turning now to the figures, example aspects are depicted with reference to one or more components described herein, where components in dashed lines may be optional. In the following, FIGS. 1-4, which may include similar or related components, are described with reference to each other.

Figure 1:
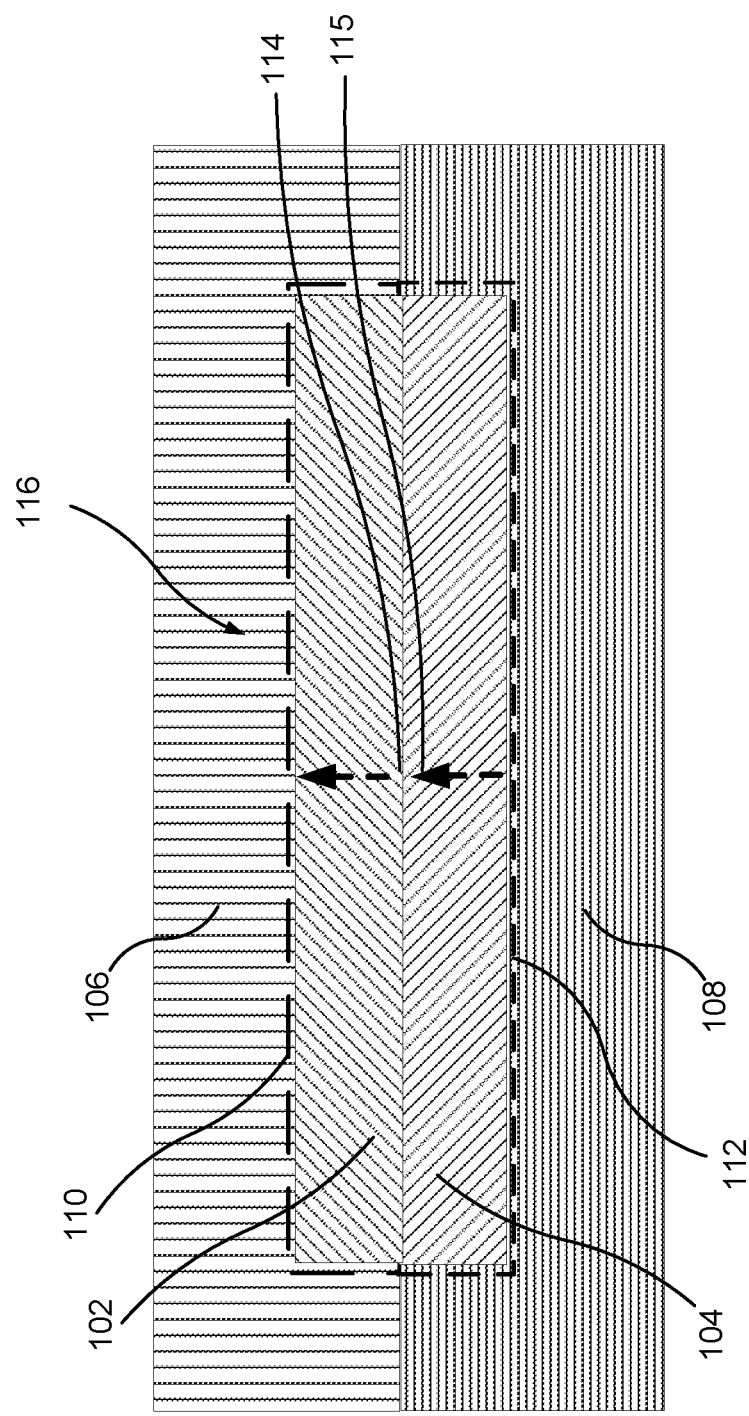
FIG. 1 is a front, cross-sectional view of an example fastening assembly in a locked state.
Figure 2:
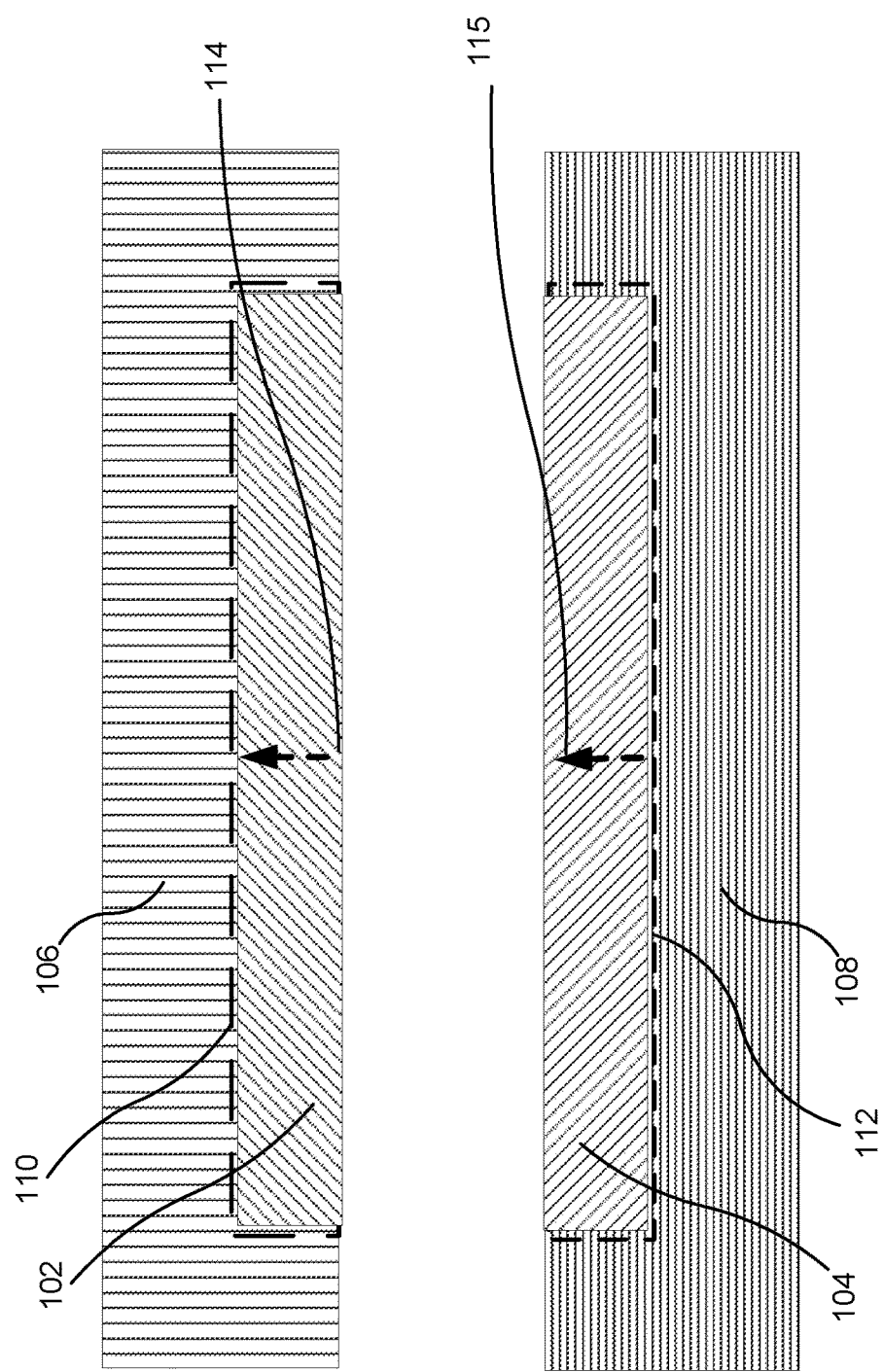
FIG. 2 is a front, cross-sectional view of the example fastening assembly of FIG. 1 in an unlocked state.

Referring to FIGS. 1-4, an example of a device 100 implements a fastening assembly 116 that includes a first permanent magnet 102 having a first operating temperature and a second permanent magnet 104 having a second operating temperature lower than the first operating temperature, such that the first permanent magnet 102 is attachable to the second permanent magnet 104 in a locked state at a first temperature lower than the second operating temperature, as shown in FIG. 1. Also, as shown in FIG. 2, the first permanent magnet 102 is releasable from the second permanent magnet 104 in an unlocked state at a second temperature higher than the second operating temperature of the second permanent magnet 104. Accordingly, the first permanent magnet 102 may be releasably attachable to the second permanent magnet 104 in the locked state. As such, heating up the fastening assembly 116 to the second temperature higher than the second operating temperature of the second permanent magnet 104 enables quick, efficient, clean, and low cost disassembly of the device 100.

In an aspect, the first permanent magnet 102 may be sized and/or otherwise configured to engage the second permanent magnet 104 in the locked state as shown in FIG. 1. For example, in an aspect, the first permanent magnet 102 has a first magnetic pole 114 that may be alignable with a corresponding attractable second magnetic pole 115 of the second permanent magnet 104 in the locked state such that at least the magnetic attraction force between the first magnetic pole 114 of the first permanent magnet 102 and the second magnetic pole 115 of the second permanent magnet 104 keeps the fastening assembly 116 in the locked state as shown in FIG. 1. For example, the first magnetic pole 114 may be one of a north pole or a south pole, and the second magnetic pole 115 may be opposite that of the first magnetic pole 114 (e.g., south if the first magnetic pole 114 is north). However, in various other alternative aspects, the first permanent magnet 102 and the second permanent magnet 104 may have multiple attractable pairs of magnetic poles and/or differently located/sized attractable pairs of magnetic poles than the first magnetic pole 114 and the second magnetic pole 115, such that the collective magnetic attraction force between such multiple attractable pairs of magnetic poles and/or differently located/sized attractable pairs of magnetic poles keeps the fastening assembly 116 in the locked state as shown in FIG. 1.

In an aspect, for example, the unlocked state of the fastening assembly 116 may be defined by a substantial reduction in the magnetic attraction force between the first permanent magnet 102 and the second permanent magnet 104 at the second temperature at least due to a de-magnetization of the second permanent magnet 104 since the second temperature is higher than the second operating temperature of the second permanent magnet 104. For example, the substantial reduction in the magnetic attraction may be a threshold percentage or threshold amount, such as greater than 50% or equal to or greater than an amount of attraction force required to maintain the device 100 in the locked state during typical usage. In an aspect, the de-magnetization of the second permanent magnet 104 causes at least a partial loss of a magnetic field or magnetic flux in the second permanent magnet 104. In an aspect, the first permanent magnet 102 may be forcibly releasable from the second permanent magnet 104 in the unlocked state by applying a force greater than any remaining and substantially reduced magnetic attraction force between the first permanent magnet 102 and the second permanent magnet 104 at the second temperature.

Optionally, in an aspect, the substantial reduction in the magnetic attraction force between the first permanent magnet 102 and the second permanent magnet 104 at the second temperature may further be due to a de-magnetization of the first permanent magnet 102 if the second temperature is higher than both the first operating temperature of the first permanent magnet 102 and the second operating temperature of the second permanent magnet 104 and if the first permanent magnet 102 is also heated up to the second temperature due to its proximity to the second permanent magnet 104 that is heated up to the second temperature. In this aspect, the de-magnetization of the first permanent magnet 102 also causes at least a partial loss of the magnetic field or the magnetic flux of the first permanent magnet 102.

In an aspect, for example, the fastening assembly 116 transitions from the locked state (e.g., see FIG. 1) to the unlocked state (e.g., see FIG. 2) when at least the second permanent magnet 104 in the fastening assembly 116 is heated up from the first temperature to the second temperature causing de-magnetization of the second permanent magnet 104. In this aspect, if the second temperature is lower than the first operating temperature of the first permanent magnet 102, the first permanent magnet 102 maintains magnetism at the second temperature that causes the second permanent magnet 104 to become de-magnetized. In an aspect, after the second permanent magnet 104 is de-magnetized at the second temperature causing or enabling transition to the unlocked/released state of the fastening assembly 116, the second permanent magnet 104 may be cooled down to below the second operating temperature and then re-magnetized, such that the fastening assembly 116 may be used in the fastened/locked state again. Accordingly, the fastening assembly 116 may be re-usable in some aspects. That is, subsequent to being detached from the second permanent magnet 104 in the unlocked state, the first permanent magnet 102 may be re-attachable to the second permanent magnet 104 (at a temperature below the second operating temperature of the second permanent magnet 104) by re-magnetization of the second permanent magnet 104.

In an aspect, the fastening assembly 116 may be used to attach/fasten a first component 106 of a device 100 to a second component 108 of the device 100.

Figure 3:
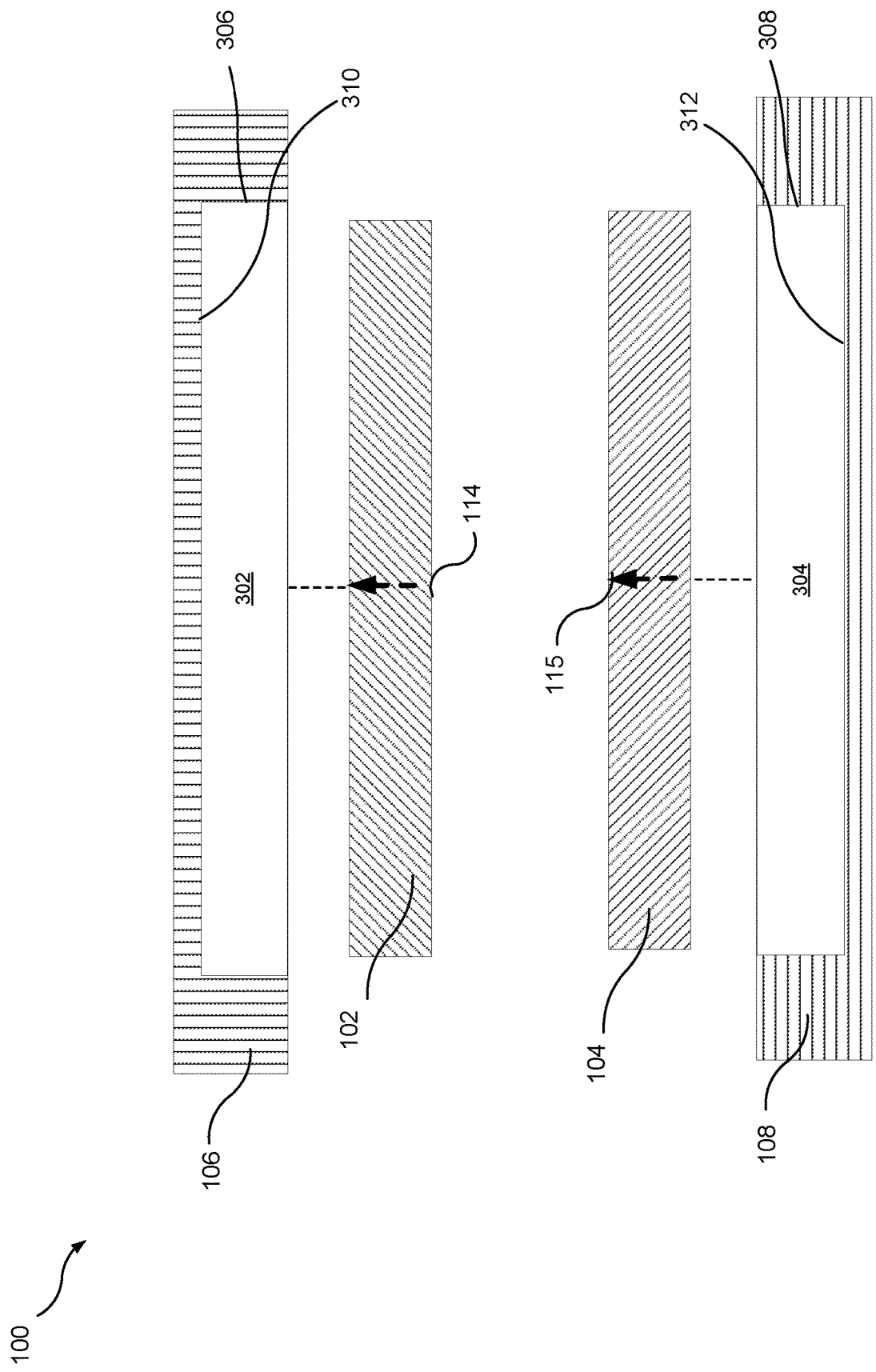
FIG. 3 is a front, exploded cross-sectional view of components of the example fastening assembly of FIG. 1.
Figure 4:
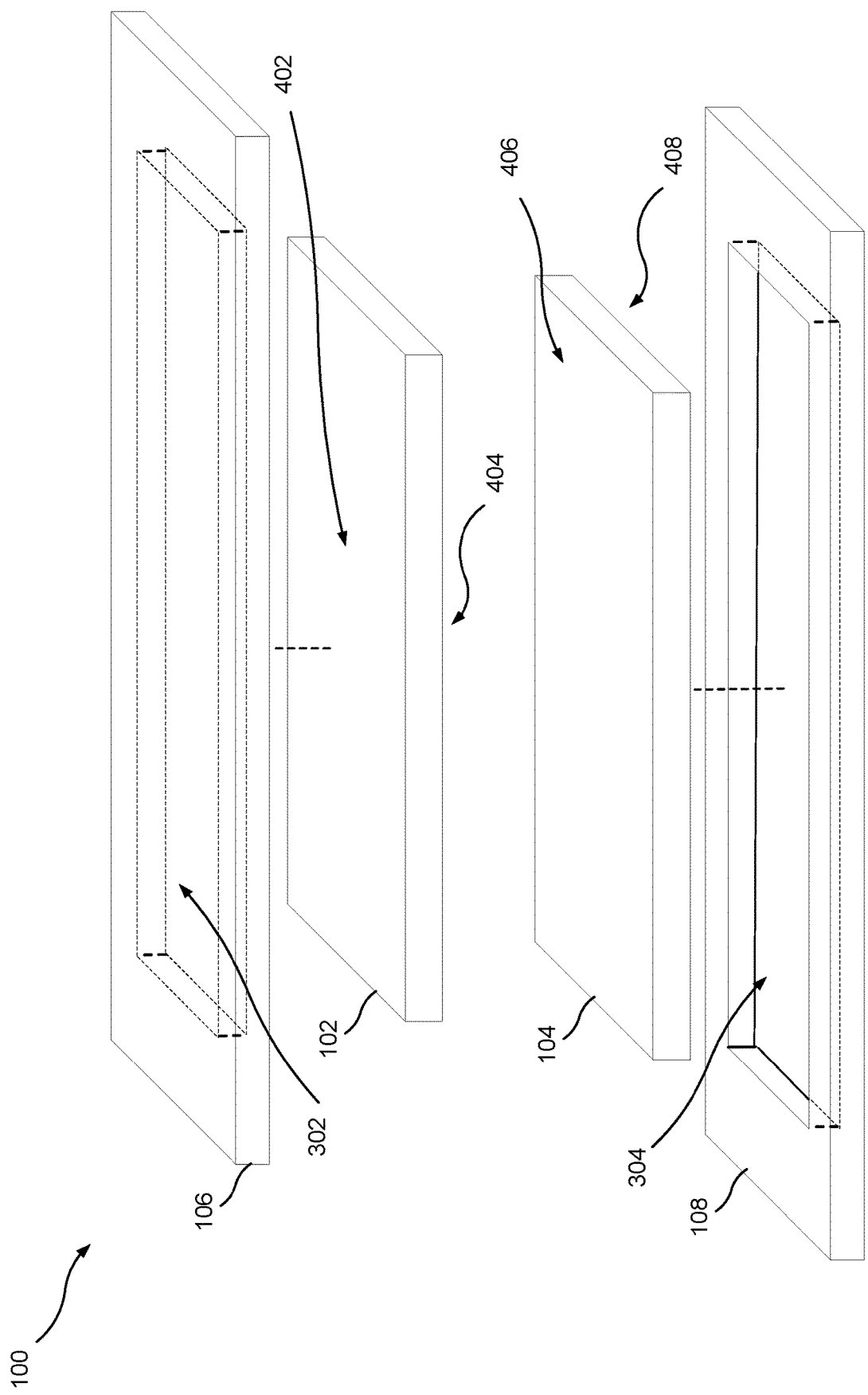
FIG. 4 is an exploded top perspective view of components of the example fastening assembly of FIG. 1.

Optionally, in an aspect and specifically referring to FIGS. 3 and 4, the first permanent magnet 102 has a magnet body sized and/or otherwise configured to fit within a first opening 302 within the first component 106, such as a pocket or a cubic/box-shaped space. For instance, the first opening 302 may be defined by a first set of walls 306 formed, pressed, molded, an/or otherwise configured in the first component 106 of the device 100. Optionally, in an aspect, the second permanent magnet 104 has a magnet body sized and/or otherwise configured to fit within a second opening 304 within the second component 108, such as a pocket or a cubic/box-shaped space. For instance, the second opening 304 may be defined by a second set of walls 308 formed, pressed, molded, an/or otherwise configured in the second component 108 of the device 100. Further, the first opening 302 may be further defined by a top wall 310 that connects to the first set of walls 306 to define an open-ended space. Similarly, the second opening 304 may be further defined by a bottom wall 312 that connects to the second set of walls 308 to define an open-ended space.

Further, a first surface 402 of the first permanent magnet 102 may be attachable to the first component 106 of the device 100, and a second surface 408 of the second permanent magnet 104 may be attachable to the second component 108 of the device 100. In this aspect, a third surface 404 of the first permanent magnet 102, opposite the first surface 402, may be attachable to a fourth surface 406 of the second permanent magnet 104, opposite the second surface 408, in the locked state so as to attach the first component 106 of the device 100 to the second component 108 of the device 100. For instance, in one example, the first surface 402 of the first permanent magnet 102 may be attachable to the first component 106, and/or the second surface 408 of the second permanent magnet 104 is attachable to the second component 108, such as by sizing and/or shaping the adjoining components so as to form a force fit attachment. For instance, in another example, the first surface 402 of the first permanent magnet 102 may be attachable to the first component 106, and/or the second surface 408 of the second permanent magnet 104 may be attachable to the second component 108, such as by connecting the components using a fastening mechanism, such as a screw, a bolt, a tang or tab, or any other type of mechanical retaining mechanism.

In an aspect, the first surface 402 of the first permanent magnet 102 extends in a first plane that is perpendicular to a second plane where the first set of walls 306 extend. In an aspect, the second surface 408 of the second permanent magnet 104 extends in a third plane that is perpendicular to a fourth plane where the second set of walls 308 extend. In an aspect, in the locked state of the fastening assembly 116, a fifth plane where the third surface 404 of the first permanent magnet 102 extends is parallel to a sixth plane where the fourth surface 406 of the second permanent magnet 104 extends.

Optionally, in an aspect and additionally referring to FIGS. 1 and 2, for example, the first surface 402 of the first permanent magnet 102 may be attachable to the first component 106 of the device 100 by a first adhesive layer 110. In an aspect, the first adhesive layer 110 may be curable at a temperature lower than the first operating temperature of the first permanent magnet 102 such that curing the first adhesive layer 110 does not de-magnetize the first permanent magnet 102. Optionally, in an aspect, for example, the second surface 408 of the second permanent magnet 104 may be attachable to the second component 108 of the device 100 by a second adhesive layer 112. In an aspect, the second adhesive layer 112 may be curable at a temperature lower than the second operating temperature of the second permanent magnet 104 such that curing the second adhesive layer 112 does not de-magnetize the second permanent magnet 104. In an aspect, each one of the first adhesive layer 110 or the second adhesive layer 112 may include, but is not limited to, a Pressure Sensitive Adhesive (PSA), a cyanoacrylate, epoxy, polyurethane, a resin, or any other type of adhesive. In some aspects, each one of the first adhesive layer 110 or the second adhesive layer 112 may include cyanoacrylates or epoxies that can withstand the temperatures required for de-magnetizing the second permanent magnet 104. In some alternative or additional aspects, however, screws or other mechanical fasteners may be used to hold the first permanent magnet 102 and/or the second permanent magnet 104 in place.

In an aspect, for example but not limited hereto, the first component 106 may be a chassis, the second component 108 may be a display assembly or a screen, and the device 100 may be a computing device such as a hand-held device, a mobile phone, a laptop computer, etc. It should be understood, however, that the first component 106 and second component 108 each may be any type of device, component, or sub-component that may be fastened together.

Table 1 provides the maximum energy product and the maximum operating temperature of non-limiting example grades of the first permanent magnet 102 and the second permanent magnet 104 that may be used in various aspects.

TABLE 1

Properties of example grades of permanent magnets

| Grade | Maximum energy product BHmax (kJ/m3 typical) | Maximum Operating Temperature (C.) |
| --- | --- | --- |
| N50 | 398 | 70 |
| N52 | 414 | 70 |
| N50M | 398 | 90 |
| N48H | 382 | 120 |
| N46SH | 366 | 150 |
| N40UH | 318 | 180 |
| N38EH | 303 | 200 |
| N30AH | 250 | 220 |
| N25BH | 190 | 230 |

As shown in Table 1, different grades of permanent magnets have different maximum operating temperatures, and a higher grade magnet has a higher maximum operating temperature as compared to a lower grade magnet. For example, for N52 grade magnets, the maximum operating temperature is 70 C, and for higher grade magnets such as N48H grade magnets, the maximum operating temperature is 120 C. If a permanent magnet is heated beyond its maximum operating temperature, the permanent magnet irreversibly and substantially lose its magnetic strength unless and until re-magnetized. A permanent magnet does not completely lose its magnetic strength unless heated up to its Curie temperature. For the example grades of permanent magnets in Table 1, the Curie temperature is above 300 C.

In an aspect, for example, the first permanent magnet 102 may be a higher grade magnet with a higher operating temperature compared to the second permanent magnet 104. In an aspect, for example, the grade of the first permanent magnet 102 and the second permanent magnet 104 may be selected such that the maximum operating temperature of the first permanent magnet 102 is at least 40 C higher than the maximum operating temperature of the second permanent magnet 104. In an aspect, for example, the grade of the first permanent magnet 102 and the second permanent magnet 104 may be selected such that the maximum operating temperature of the first permanent magnet 102 is 50 C higher than the maximum operating temperature of the second permanent magnet 104. For example, the first permanent magnet 102 may be an N48H grade magnet with a maximum operating temperature of 120 C, and the second permanent magnet 104 may be an N52 grade magnet with a maximum operating temperature of 70 C. Accordingly, when the first permanent magnet 102 and the second permanent magnet 104 are aligned at temperatures below 70 C, the fastening assembly 116 is in the locked state due to the strong magnetic force between the first permanent magnet 102 and the second permanent magnet 104. If the fastening assembly 116 or at least the second permanent magnet 104 is heated up beyond the maximum operating temperature of the second permanent magnet 104, i.e., 70 C, the second permanent magnet 104 substantially loses magnetism and the fastening assembly 116 transitions from the locked state to the unlocked where the first permanent magnet 102 can be detached from the second permanent magnet 104 by applying a force greater than any remaining and substantially reduced magnetic attraction force between the first permanent magnet 102 and the second permanent magnet 104.

In an aspect, in order to transition from the locked state to the unlocked state, the fastening assembly 116 or at least the second permanent magnet 104 may be heated beyond 70 C for at least a minimum time duration so that at least a substantial portion of the body of the second permanent magnet 104 reaches a temperature beyond 70 C. In an aspect, for example, the fastening assembly 116 or at least the second permanent magnet 104 may be heated, for example, by a heating fixture or a heat gun, and the minimum time duration required for heating the second permanent magnet 104 may depend on the body size of the second permanent magnet 104 and/or the proximity/location of the heating tool with respect to the second permanent magnet 104. In an aspect, for example, a heat gun may be used to heat up the second permanent magnet 104 for 5-10 minutes to transition from the locked state to the unlocked state.

In an aspect, after a sufficient amount of time at a temperature above 70 C (e.g., one minute at 75-80 C), the second permanent magnet 104 undergoes irreversible magnetic field loss which results in an at least substantially reduced magnet force between and the first permanent magnet 102 and the second permanent magnet 104 such that the first permanent magnet 102 can be detached from the second permanent magnet 104 by applying a small force, and the amount of the force may depend on the geometry and/or the surface area of the first permanent magnet 102 and/or the second permanent magnet 104. In an aspect, since the operating temperature of the first permanent magnet 102 is 120 C, the magnetism of the first permanent magnet 102 may not be affected by temperatures below 120 C. Accordingly, applying a temperature between 70 C and 120 C may substantially reduce the magnetism of the second permanent magnet 104 but may not affect the magnetism of the first permanent magnet 102. Therefore, the second permanent magnet 104 may later be re-magnetized, for example, by being placed within a magnetizing fixture, so that the second permanent magnet 104 may be re-used to attach the first permanent magnet 102 to the second permanent magnet 104 in the locked state in the fastening assembly 116.

In an aspect, in some implementations, the thinner the second permanent magnet 104 is, the faster it may lose its magnetic property when heated beyond its maximum operating temperature. In an aspect, given two heating temperatures that are both above the maximum operating temperature of the second permanent magnet 104, the higher heating temperature may cause the second permanent magnet 104 to lose its magnetic property faster compared to the lower heating temperature. Optionally, in an aspect, in order to totally de-magnetize the second permanent magnet 104 and reduce the magnetic attraction force between the first permanent magnet 102 and the second permanent magnet 104 to zero, the second permanent magnet 104 may be heated up to its Curie temperature.

Aspects of the fastening assembly 116 may be applicable in any devices where the first component 106 and the second component 108 need to be fastened together without screws or other unsightly fastening mechanisms that cannot provide clean aesthetics. Alternatively and/or additionally, aspects of the fastening assembly 116 may be applicable as an alternative to PSA-based fastening. However, PSA-based fastening mechanisms are not re-usable once removed, and the leftover PSA needs to be cleaned after removing a PSA-based fastening mechanism, while the fastening assembly 116 may be re-usable with no such cleaning needed after unlocking the fastening assembly 116.

Optionally, in aspects where the second permanent magnet 104 is attached to the second component 108 of the device 100 by the second adhesive layer 112, the maximum operating temperature of the second permanent magnet 104 may be higher than the bonding temperature of the second adhesive layer 112 such that curing the second adhesive layer 112 does not de-magnetize the second permanent magnet 104. In one aspect, for example, if the second adhesive layer 112 is curable at room temperature, the second permanent magnet 104 may be an N52 grade permanent magnet or a higher grade permanent magnet.

Optionally, in an aspect, the fastening assembly 116 may include a fastener member instead of the first permanent magnet 102, and the material of the fastener member may be a magnetically-attractive material, such as a ferrous or soft magnet material, for being magnetically attractable by the second permanent magnet 104 in the locked state. In this optional aspect, the magnet body of the second permanent magnet 104 may be sized and/or otherwise configured to provide a magnetic attraction force between the second permanent magnet 104 and the fastener member to keep the fastening assembly 116 in the locked state at a temperature that is lower than the maximum operating temperature of the second permanent magnet 104. Specifically, the magnet body of the second permanent magnet 104 may be sized and/or otherwise configured to induce a magnetic field around the second permanent magnet 104 such that when the fastener member is positioned within such magnetic field, the magnetic field magnetizes the magnetically-attractive material of the fastener member, and the interaction between the magnetic field of the second permanent magnet 104 and the magnetized material of the fastener member results in the magnetic attraction force between the second permanent magnet 104 and the fastener member. In an aspect, the fastener member may be made of stainless steel. For example, in an aspect, the fastener member may be made of a 100 grade steel. In an aspect, when the second permanent magnet 104 is heated up to a temperature that is above the maximum operating temperature of the second permanent magnet 104, the second permanent magnet 104 may substantially lose magnetism. That is, the magnetic field of the second permanent magnet 104 may be substantially weakened, resulting in a substantial reduction in the magnetic attraction force between the second permanent magnet 104 and the fastener member. Accordingly, the fastening assembly 116 may transition from the locked state to the unlocked state where the second permanent magnet 104 can be easily detached/disengaged from the fastener member by applying a small force.

Figure 5:
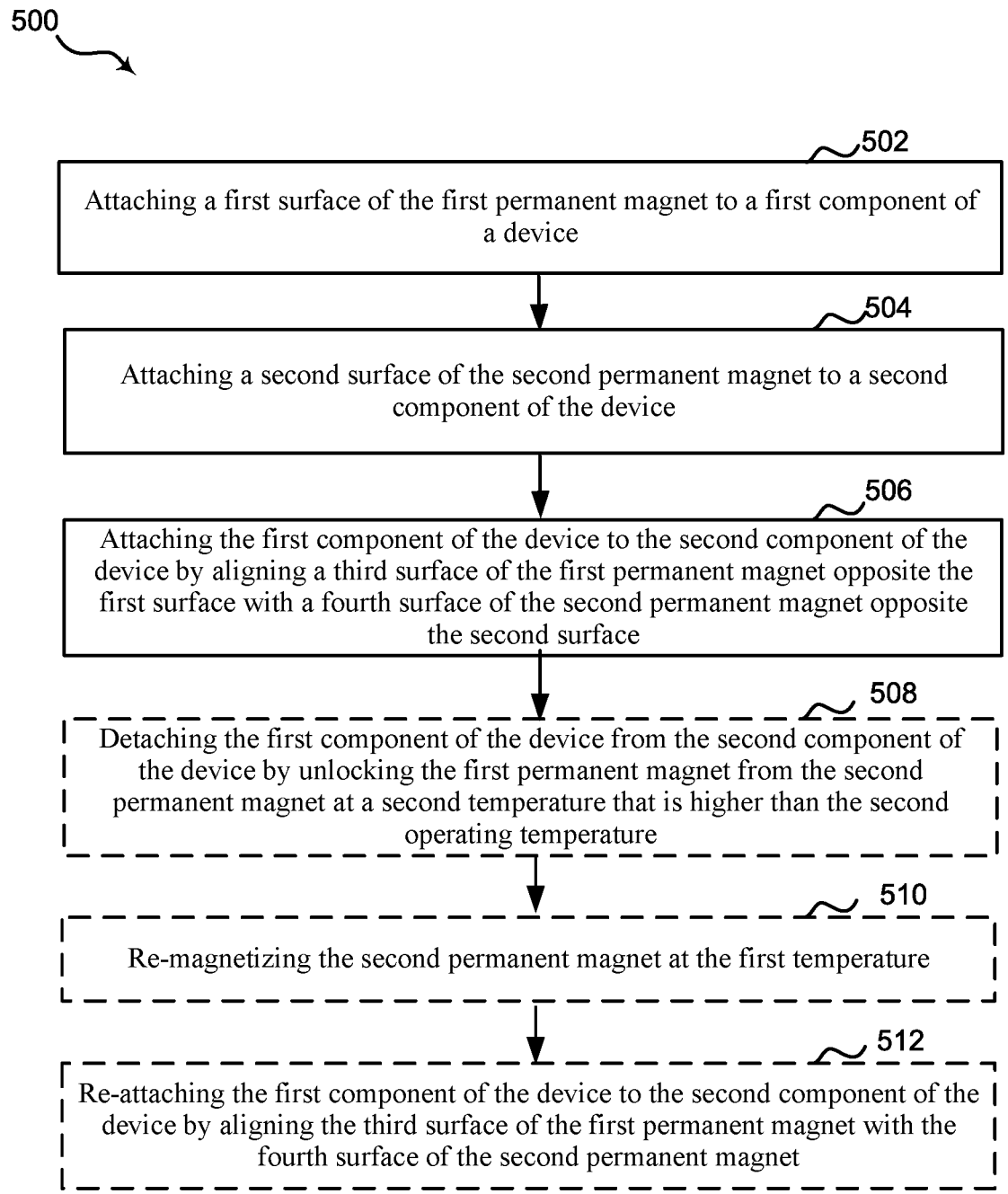
FIG. 5 is a flowchart of an example method of using the fastening assembly of FIG. 1.

Referring now to the example flowchart 500 in FIG. 5, an aspect of the present disclosure provides a method of using the fastening assembly 116 in the device 100 for connecting the first component 106 of the device 100 to the second component 108 of the device 100. At 502 the method includes attaching the first surface 402 of the first permanent magnet 102 to the first component 106 of the device 100. At 504 the method further includes attaching the second surface 408 of the second permanent magnet 104 to the second component 108 of the device 100. At 506 the method further includes attaching the first component 106 of the device 100 to the second component 108 of the device 100 by aligning the third surface 404 of the first permanent magnet 102 opposite the first surface 402 with the fourth surface 406 of the second permanent magnet 104 opposite the second surface 408 so as to lock the first permanent magnet 102 with the second permanent magnet 104 at the first temperature lower than the second operating temperature of the second permanent magnet 104.

Optionally, at 508 the method may further include detaching the first component 106 of the device 100 from the second component 108 of the device 100 by unlocking the first permanent magnet 102 from the second permanent magnet 104 at the second temperature that is higher than the second operating temperature of the second permanent magnet 104. In an aspect, for example, the unlocking may include heating the second permanent magnet 104 up to the second temperature so as to de-magnetize the second permanent magnet 104, and applying a force greater than the magnetic attraction force between the first permanent magnet 102 and the second permanent magnet 104 at the second temperature above the second operating temperature of the second permanent magnet 104.

Optionally, when the second temperature is above the second operating temperature of the second permanent magnet 104 but below a first operating temperature of the first permanent magnet 102 and hence does not de-magnetize the first permanent magnet 102, at 510 the method may further include re-magnetizing the second permanent magnet 104 at the first temperature below the second operating temperature of the second permanent magnet 104, and at 512 the method may further include re-attaching the first component 106 of the device 100 to the second component 108 of the device 100 by aligning the third surface 404 of the first permanent magnet 102 with the fourth surface 406 of the second permanent magnet 104 so as to lock the first permanent magnet 102 with the second permanent magnet 104 at the first temperature.

Optionally, in an aspect, the attaching of the first surface 402 of the first permanent magnet 102 to the first component 106 of the device 100 may include curing the first adhesive layer 110 between the first surface 402 of the first permanent magnet 102 and the first component 106 of the device 100 at a third temperature lower than the first operating temperature.

Optionally, in an aspect, the attaching of the second surface 408 of the second permanent magnet 104 to the second component 108 of the device 100 may include curing the second adhesive layer 112 between the second surface 408 of the second permanent magnet 104 and the second component 108 of the device 100 at a third temperature lower than the second operating temperature.

Optionally, in an aspect, the attaching of the first surface 402 of the first permanent magnet 102 to the first component 106 of the device 100 may include placing the first permanent magnet 102 within the first opening 302 configured on the first component 106 of the device 100.

Optionally, in an aspect, the attaching of the second surface 408 of the second permanent magnet 104 to the second component 108 of the device 100 includes placing the second permanent magnet 104 within the second opening 304 configured on the second component 108 of the device 100.

In some implementations, the apparatus of the present disclosure may be in the form of a kit of parts that can be assembled to form the apparatus. For instance, in an aspect a fastening assembly kit is provided. The fastening assembly kit includes a first permanent magnet having a first operating temperature and a second permanent magnet having a second operating temperature lower than the first operating temperature. The first permanent magnet is attachable to the second permanent magnet in a locked state at a first temperature lower than the second operating temperature. The first permanent magnet is releasable from the second permanent magnet in an unlocked state at a second temperature that is higher than the second operating temperature. In an aspect, the fastening assembly kit further includes a first component attachable to a first surface of the first permanent magnet, and a second component attachable to a second surface of the second permanent magnet, where a third surface of the first permanent magnet opposite the first surface is attachable to a fourth surface of the second permanent magnet opposite the second surface in the locked state so as to attach the first component to the second component. Accordingly, the first permanent magnet is releasably attachable to the second permanent in the locked state. In an aspect, the first permanent magnet is forcibly releasable from the second permanent magnet in the unlocked state by applying a force greater than a magnetic attraction force between the first permanent magnet and the second permanent magnet at the second temperature.

Thus, the described fastening assembly allows for using two permanent magnets of different grades/operating temperatures to provide a temporary fastening mechanism. The two permanent magnets are sized and/or otherwise configured such that a high strength magnetic attraction force between the two permanent magnets causes a locked state of the fastening assembly. The two permanent magnets may be separated by heating at least one of the permanent magnets up to or slightly over its maximum operating temperature.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A fastening assembly, comprising:
a first permanent magnet of a first magnet grade having a first operating temperature as a first magnet property; and
a second permanent magnet of a second magnet grade having a second operating temperature as a second magnet property, the second operating temperature being lower than the first operating temperature, wherein the first permanent magnet is attachable to the second permanent magnet in a locked state at a first temperature that is lower than the second operating temperature, wherein the first permanent magnet is releasable from the second permanent magnet in an unlocked state at a second temperature that is higher than the second operating temperature.

2. The fastening assembly of claim 1, wherein the locked state is defined by a magnetic attraction force between the first permanent magnet and the second permanent magnet at the first temperature based on a first magnetic pole of the first permanent magnet and a second magnetic pole of the second permanent magnet having an adjacent position, wherein the unlocked state is defined by a substantial reduction in the magnetic attraction force between the first permanent magnet and the second permanent magnet at the second temperature at least due to a de-magnetization of the second permanent magnet.

3. The fastening assembly of claim 1, wherein the first permanent magnet is releasably attachable to the second permanent magnet in the locked state, wherein the first permanent magnet is forcibly releasable from the second permanent magnet in the unlocked state by applying a force greater than a magnetic attraction force between the first permanent magnet and the second permanent magnet at the second temperature.

4. The fastening assembly of claim 1, wherein the second permanent magnet is de-magnetize-able at the second temperature, wherein, subsequent to being de-magnetized, the second permanent magnet is re-magnetize-able at the first temperature.

5. The fastening assembly of claim 4, wherein the first permanent magnet maintains magnetism at the second temperature.

6. The fastening assembly of claim 4, wherein subsequent to being detached from the second permanent magnet in the unlocked state, the first permanent magnet is re-attachable to the second permanent magnet at the first temperature by re-magnetization of the second permanent magnet.

7. The fastening assembly of claim 1, wherein a first surface of the first permanent magnet is attachable to a first component of a device, wherein a second surface of the second permanent magnet is attachable to a second component of the device, wherein a third surface of the first permanent magnet opposite the first surface is attachable to a fourth surface of the second permanent magnet opposite the second surface in the locked state so as to attach the first component of the device to the second component of the device.

8. The fastening assembly of claim 7, wherein the first surface of the first permanent magnet is attachable to the first component of the device by an adhesive layer that is curable at a third temperature lower than the first operating temperature of the first permanent magnet.

9. The fastening assembly of claim 7, wherein the second surface of the second permanent magnet is attachable to the second component of the device by an adhesive layer that is curable at a third temperature lower than the second operating temperature of the second permanent magnet.

10. A fastening assembly kit, comprising:
a first permanent magnet of a first magnet grade having a first operating temperature as a first magnet property; and
a second permanent magnet of a second magnet grade having a second operating temperature as a second magnet property, the second operating temperature being lower than the first operating temperature, wherein the first permanent magnet is attachable to the second permanent magnet in a locked state at a first temperature lower than the second operating temperature, wherein the first permanent magnet is releasable from the second permanent magnet in an unlocked state at a second temperature that is higher than the second operating temperature.

11. The fastening assembly kit of claim 10, further comprising:
a first component attachable to a first surface of the first permanent magnet; and
a second component attachable to a second surface of the second permanent magnet, wherein a third surface of the first permanent magnet opposite the first surface is attachable to a fourth surface of the second permanent magnet opposite the second surface in the locked state so as to attach the first component to the second component.

12. The fastening assembly kit of claim 10, wherein the first permanent magnet is releasably attachable to the second permanent magnet in the locked state, wherein the first permanent magnet is forcibly releasable from the second permanent magnet in the unlocked state by applying a force greater than a magnetic attraction force between the first permanent magnet and the second permanent magnet at the second temperature.

* * * * *